(12) United States Patent
Lee et al.

(10) Patent No.: US 10,658,716 B2
(45) Date of Patent: May 19, 2020

(54) BATTERY MODULE

(71) Applicant: LG CHEM, LTD., Seoul (KR)

(72) Inventors: Jong-Young Lee, Daejeon (KR);
Eun-Gyu Shin, Daejeon (KR);
Jeong-O Mun, Daejeon (KR);
Yoon-Koo Lee, Daejeon (KR);
Hang-June Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 240 days.

(21) Appl. No.: 15/567,184

(22) PCT Filed: Sep. 23, 2016

(86) PCT No.: PCT/KR2016/010702
§ 371 (c)(1),
(2) Date: Oct. 17, 2017

(87) PCT Pub. No.: WO2017/052296
PCT Pub. Date: Mar. 30, 2017

(65) Prior Publication Data
US 2018/0138565 A1 May 17, 2018

(30) Foreign Application Priority Data
Sep. 24, 2015 (KR) .......................... 10-2015-0135686

(51) Int. Cl.
*H01M 10/6554* (2014.01)
*H01M 2/10* (2006.01)
(Continued)

(52) U.S. Cl.
CPC ..... *H01M 10/6554* (2015.04); *H01M 2/1061* (2013.01); *H01M 2/1077* (2013.01);
(Continued)

(58) Field of Classification Search
None
See application file for complete search history.

(56) References Cited

U.S. PATENT DOCUMENTS

2012/0231315 A1  9/2012  Yoon
2012/0282511 A1  11/2012 Feng
(Continued)

FOREIGN PATENT DOCUMENTS

EP    3 007 249 A1    4/2016
JP    2001-135282 A   5/2001
(Continued)

OTHER PUBLICATIONS

International Search Report for PCT/KR2016/010702 (PCT/ISA/210) dated Jan. 23, 2017.

*Primary Examiner* — Alix E Eggerding
(74) *Attorney, Agent, or Firm* — Birch, Stewart, Kolasch & Birch, LLP

(57) ABSTRACT

The present disclosure relates to a battery module having stable strength and rigidity, high sealability and assemblability, and improved productivity. The battery module of the present disclosure includes: a cell assembly; a cooling plate; a front cover having a lower portion welded to the cooling plate; a rear cover having a lower portion welded to the cooling plate; a left side cover having a lower end portion welded to the cooling plate and a rear end portion welded to the rear cover; a right side cover having a lower end portion welded to the cooling plate, a front end portion welded to the front cover, and a rear end portion welded to the rear cover; and an upper plate having a left end portion welded to the left side cover and a right end portion welded to the right side cover.

15 Claims, 11 Drawing Sheets

(51) Int. Cl.
*H01M 10/613* (2014.01)
*H01M 10/625* (2014.01)

(52) U.S. Cl.
CPC ........ *H01M 10/613* (2015.04); *H01M 10/625* (2015.04); *H01M 2220/20* (2013.01)

(56) References Cited

U.S. PATENT DOCUMENTS

| | | | |
|---|---|---|---|
| 2013/0022859 A1 | 1/2013 | Lim | |
| 2013/0171487 A1* | 7/2013 | Bull | H01M 2/1077 429/99 |
| 2014/0242429 A1 | 8/2014 | Lee et al. | |
| 2014/0272508 A1* | 9/2014 | Musetti | H01M 2/1077 429/99 |
| 2015/0037649 A1* | 2/2015 | Wyatt | H01M 10/625 429/120 |
| 2015/0228936 A1* | 8/2015 | Kajiwara | H01M 2/0217 429/163 |
| 2015/0333383 A1* | 11/2015 | Janarthanam | H01M 10/613 429/120 |
| 2017/0176108 A1* | 6/2017 | Palanchon | H01M 10/6556 |

FOREIGN PATENT DOCUMENTS

| | | |
|---|---|---|
| JP | 2012-69408 A | 4/2012 |
| JP | 2012-248374 A | 12/2012 |
| JP | 2013-243079 A | 12/2013 |
| JP | 2014-504438 A | 2/2014 |
| JP | 2015-111493 A | 6/2015 |
| KR | 10-2012-0048802 A | 5/2012 |
| KR | 10-1271858 B1 | 6/2013 |
| KR | 10-2013-0086677 A | 8/2013 |
| KR | 10-2014-0085890 A | 7/2014 |
| KR | 10-2014-0145250 A | 12/2014 |
| KR | 10-1481198 B1 | 1/2015 |
| WO | WO 89/00344 A2 | 1/1989 |
| WO | 10-2013-0011740 A | 1/2013 |
| WO | WO 2014/196422 A1 | 12/2014 |

* cited by examiner

BATTERY MODULE

TECHNICAL FIELD

The present application claims priority to Korean Patent Application No. 10-2015-0135686 filed on Sep. 24, 2015 in the Republic of Korea, the disclosure of which is incorporated herein by reference.

The present disclosure relates to a battery including at least one secondary cell, and more particularly, to a battery module having high processability, high sealability, and fewer components, and a battery pack including the battery module, and an automobile including the battery module.

BACKGROUND ART

Examples of currently commercialized secondary cells include nickel-cadmium cells, nickel-metal hydride cells, nickel-zinc cells, and lithium secondary cells. Among such various secondary cells, lithium secondary cells are freely rechargeable because of having substantially no memory effect compared with nickel-based secondary cells, and have a very low self-discharge rate and high energy density. Owing to these merits, there has been high interest in lithium secondary cells.

In general, lithium secondary cells use a lithium-based oxide as a positive electrode active material and a carbonaceous material as a negative electrode active material. A lithium secondary cell may include: an electrode assembly in which a positive electrode plate coated with such a positive electrode active material and a negative electrode plate coated with such a negative electrode active material are disposed with a separator therebetween; and a case in which the electrode assembly and an electrolytic solution are sealed.

In general, according to case types, lithium secondary cells may be classified into a can type in which an electrode assembly is accommodated in a metal can, and a pouch type in which an electrode assembly is accommodated in a pouch formed of an aluminum laminate sheet.

In recent years, secondary cells have been widely used not only in small-sized devices such as portable electronic devices, but also in medium to large-sized devices such as automobiles or power storage devices. For use in such medium to large-sized devices, a large number of secondary cells may be electrically connected to increase capacity and output power. In particular, since it is easy to stack pouch-type secondary cells, pouch-type cells are widely used in such middle to large-sized devices.

The mechanical strength, that is, rigidity of a battery module including a plurality of pouch-type secondary cells as described above should be equal to or greater than a certain value so that the battery module may not be broken by external impacts, vibrations, or the like. In addition, it is necessary to securely seal battery modules to prevent permeation of foreign substances such as moisture. Moreover, battery modules having high assemblability and fewer components are preferable to increasing productivity.

DISCLOSURE

Technical Problem

The present disclosure is designed to solve the problems of the related art, and therefore the present disclosure is directed to providing a battery module having stable strength and rigidity, high sealability and assemblability, and improved productivity, and an automobile including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the objectives, the present disclosure provides a battery module including: a cell assembly including a plurality of secondary cells stacked in at least one direction; a cooling plate having a plate shape and placed below the cell assembly to receive the cell assembly thereon; a front cover covering a front end portion of the cell assembly and including a lower portion welded to the cooling plate; a rear cover covering a rear end portion of the cell assembly and including a lower portion welded to the cooling plate; a left side cover covering a left side of the cell assembly, the left side cover including a lower end portion welded to the cooling plate, a front end portion welded to the front cover, and a rear end portion welded to the rear cover; a right side cover covering a right side of the cell assembly, the right side cover including a lower end portion welded to the cooling plate, a front end portion welded to the front cover, and a rear end portion welded to the rear cover; and an upper plate covering an upper portion of the cell assembly, the upper plate including a left end portion welded to the left side cover and a right end portion welded to the right side cover.

Here, at least two of the cooling plate, the front cover, the rear cover, the left side cover, the right side cover, and the upper plate may be welded together by a friction stir welding method.

Furthermore, the cooling plate may include an aluminum-containing material, and the front cover, the rear cover, the left side cover, the right side cover, and the upper plate may each include a steel-containing material.

Furthermore, an insulative coating layer including an electrically insulative material or an insulative sheet including an electrically insulative material may be formed or provided on at least a portion of an inner surface of at least one of the front cover, the rear cover, the left side cover, the right side cover, and the upper plate.

Furthermore, a thermal interface material may be provided between the cooling plate and the cell assembly.

Furthermore, the left side cover and the right side cover may be each welded to at least one of the front cover, the rear cover, the cooling plate, and the upper plate by continuously bringing edges thereof into contact with each other and welding the edges together.

Here, zones of the left side cover and the right side cover welded to at least one of the front cover, the rear cover, the cooling plate, and the upper plate may each have a straight line shape continuously extending from an end to the other end thereof.

Furthermore, each of zones of the left side cover and the right side cover welded to at least one of the front cover, the rear cover, the cooling plate, and the upper plate may be discontinuous from an end to the other end thereof.

Furthermore, front, rear, upper, and lower end weld lines of the left side cover and the right side cover may be formed in a ring shape.

Furthermore, at least one of the front cover and the rear cover may include a stepped portion such that an end portion of at least one of the left side cover and the right side cover may be placed on the stepped portion by an outside-to-inside insertion motion.

Furthermore, at least one of the cooling plate and the upper plate may include a stepped portion such that an end portion of at least one of the left side cover and the right side may be placed on the stepped portion by an outside-to-inside insertion motion.

Furthermore, all joining portions of the left side cover and the right side cover to be jointed to the front cover, the rear cover, the cooling plate, and the upper plate may be exposed at lateral sides of the battery module.

A heat shield may be provided between the cell assembly and a weld zone of at least one of the cooling plate, the front cover, the rear cover, the left side cover, the right side cover, and the upper plate so as to prevent heat transfer in an outside-to-inside direction.

Furthermore, to achieve the objectives, the present disclosure provides a battery pack including the battery module.

Furthermore, to achieve the objectives, the present disclosure provides an automobile including the battery module.

Advantageous Effects

According to an aspect of the present disclosure, the battery module may have high scalability. In particular, according to the aspect of the present disclosure, the scalability of the battery module may be stably maintained even at a high pressure.

Therefore, according to these aspects of the present disclosure, foreign substances such as moisture or dust may not easily penetrate into the battery module, thereby preventing the battery module from breaking down or being damaged.

In addition, according to an aspect of the present disclosure, the rigidity of the battery module may be stably guaranteed.

In addition, according to an aspect of the present disclosure, the battery module may be easily assembled and high processability.

In addition, according to an aspect of the present disclosure, the battery module may not include sealing parts such as O-rings, cooling parts such as cooling fins, and reinforcement or fixing components such as end plates or cartridges. Therefore, the number of components of the battery module may be reduced.

Therefore, according to these aspects of the present disclosure, the manufacturing costs and time and the weight of the battery module may be reduced, and thus the productivity of the battery module may be improved.

DESCRIPTION OF DRAWINGS

The accompanying drawings illustrate preferred embodiments of the present disclosure and together with the foregoing disclosure, serve to provide further understanding of the technical features of the present disclosure, and thus the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
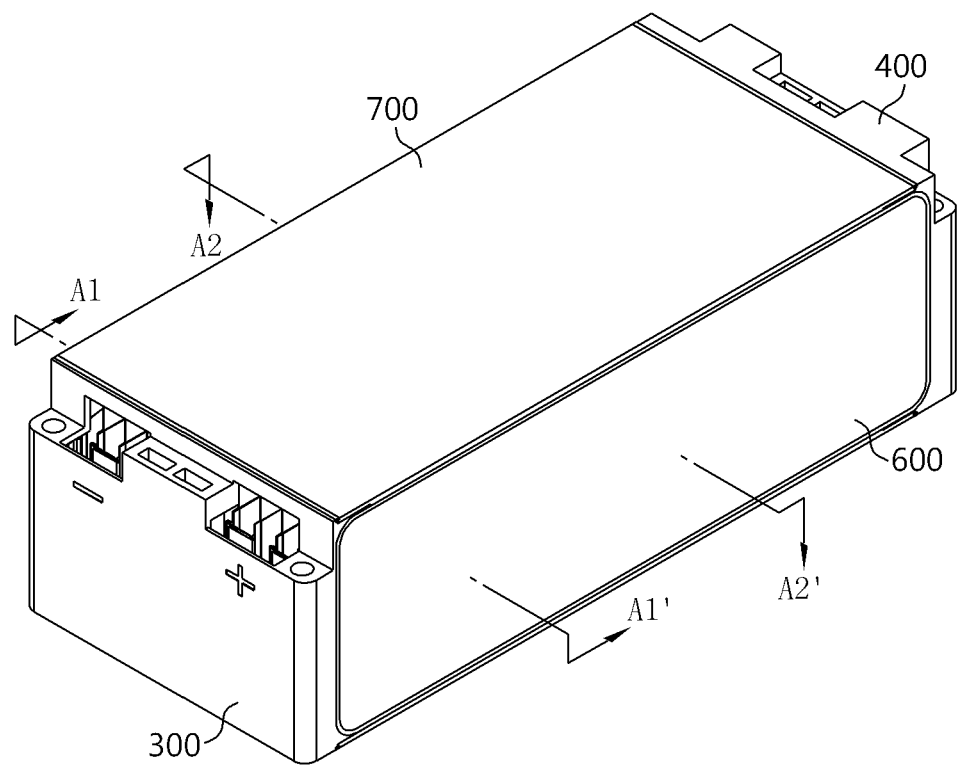
FIG. 1 is a perspective view schematically illustrating a battery module according to an embodiment of the present disclosure.
Figure 2:
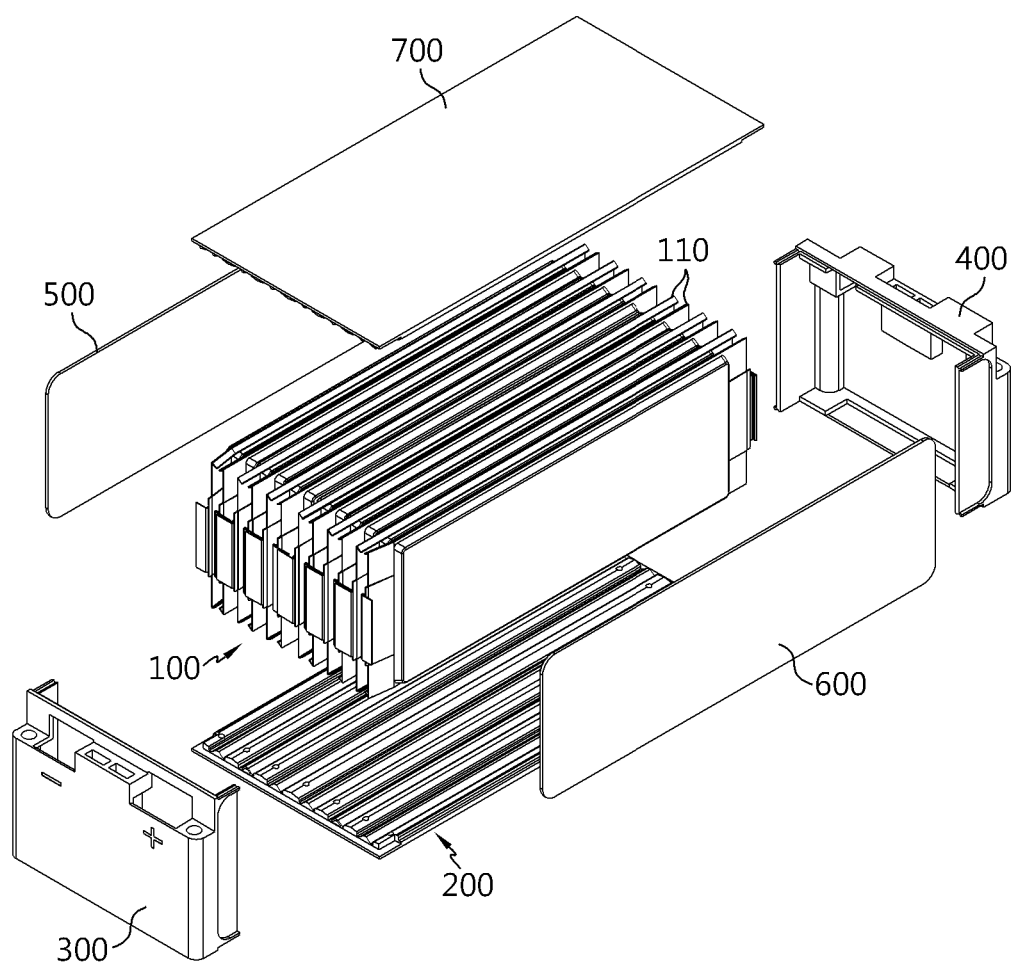
FIG. 2 is an exploded perspective view illustrating the configuration shown in FIG. 1.
Figure 3:
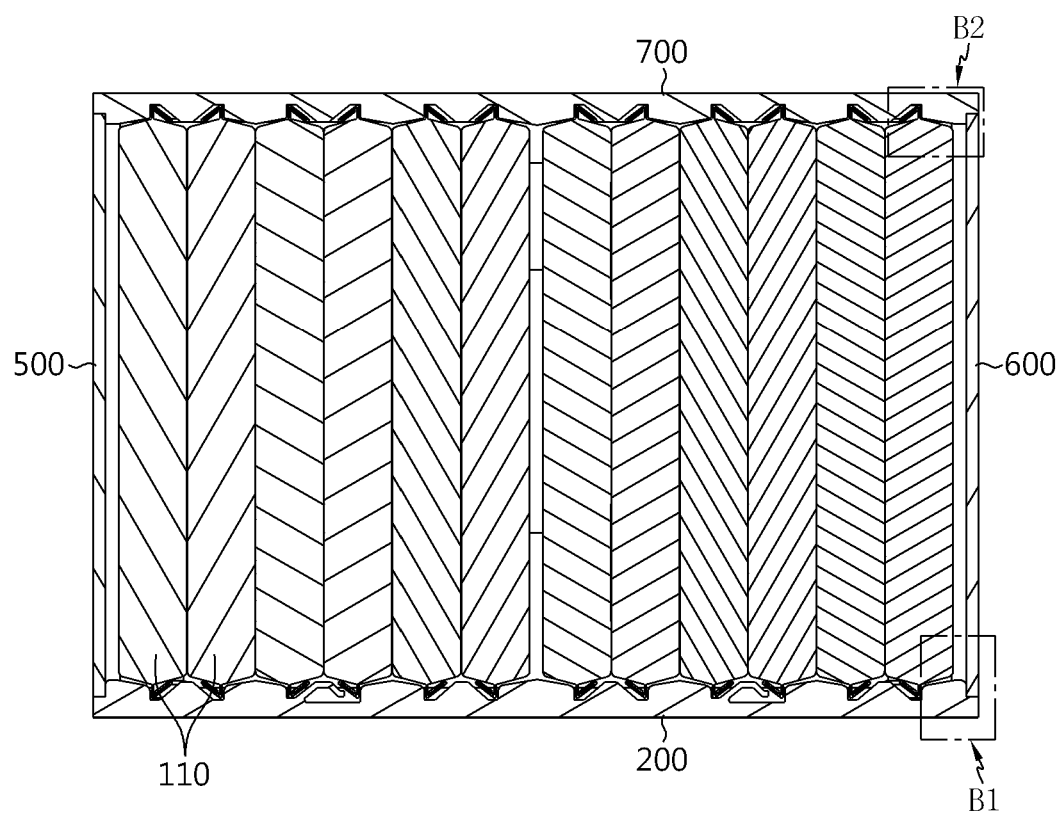
FIG. 3 is a cross-sectional view taken along line A1-A1' of FIG. 1.

FIG. 1 is a perspective view schematically illustrating a configuration of a battery module according to an embodiment of the present disclosure, and FIG. 2 is an exploded perspective view illustrating the configuration shown in FIG. 1. In addition, FIG. 3 is a cross-sectional view taken along line A1-A1' of FIG. 1. That is, FIG. 3 is a vertical cross-sectional view illustrating the battery module according to the embodiment of the present disclosure.

Referring to FIGS. 1 to 3, the battery module of the present disclosure may include a cell assembly 100, a cooling plate 200, a front cover 300, a rear cover 400, a left side cover 500, a right side cover 600, and an upper plate 700.

The cell assembly 100 may include secondary cells 110. In particular, the secondary cells 110 may be pouch-type secondary cells. Each of the pouch-type secondary cells 110 may include an electrode assembly, an electrolyte, and a pouch-type case.

The electrode assembly is an assembly of electrodes and a separator. For example, the electrode assembly may be formed by arranging at least one positive electrode plate and at least one negative electrode plate with a separator therebetween. In addition, the electrode plates of the electrode assembly may be provided with electrode tabs, respectively, and at least one of the electrode tabs may be connected to an electrode lead. In addition, the electrode lead may be placed between portions of the pouch-type case, and an end of the electrode lead may be exposed to the outside. The exposed portion of the electrode lead may function as an electrode terminal of the secondary cell 110.

The pouch-type case may accommodate the electrode assembly together with the electrolyte in an inner space thereof. In addition, edge portions of the pouch-type case may be sealed by a method such as a thermal fusion method. The pouch-type case may include a left pouch and a right pouch. Each of the pouches may include an external insulative layer, a metal layer, and an internal adhesive layer, and the internal adhesive layers of the pouches may be fused to each other.

This structure of the secondary cells 110 would be obvious to those skilled in the art to which the present disclosure pertains, and thus a detailed description thereof will not be presented. In addition, the battery module of the present disclosure may include various secondary cells known at the time of tiling the present disclosure.

The secondary cells 110 included in the battery module may be stacked in at least one direction. For example, as shown in FIGS. 2 and 3, a plurality of pouch-type secondary cells 110 may be placed in a standing position in a direction perpendicular to the ground such that two large surfaces of each pouch-type secondary cell 110 may be placed at left and right sides, and sealing portions of each pouch-type secondary cell 110 may be placed at upper, lower, front, and rear sides. In addition, the secondary cells 110 placed in a standing position as described above may be arranged in parallel to each other in a left-to-right direction such that large surfaces thereof may face each other.

The cooling plate 200 may be placed below the cell assembly 100. Therefore, the cooling plate 200 may protect the cell assembly 100 from physical or chemical factors such as vibration or moisture applied to the cell assembly 100 from the lower outside of the battery module.

The cooling plate 200 may include a thermally conductive material. Therefore, when heat is generated from the cell assembly 100, the heat may be transferred to the outside of the battery module through the cooling plate 200. For example, the cooling plate 200 may include a metallic material.

In particular, the cell assembly 100 may be horizontally placed on an upper portion of the cooling plate 200. In this case, each of the secondary cells 110 may stand on the upper portion of the cooling plate 200 such that lower portions of all the secondary cells 110 may adjoin the cooling plate 200. Therefore, heat may be directly transferred from each of secondary cells 110 to the cooling plate 200.

The cooling plate 200 may have a plate-like shape. In addition, the cell assembly 100 may be placed on the upper portion of the cooling plate 200. That is, as shown in FIG. 3, the cell assembly 100 may be in direct contact with the upper portion of the cooling plate 200. In this case, the cooling plate 200 may support the cell assembly 100 in an upward direction.

In the battery module of the present disclosure, the cell assembly 100 does not need cartridges. In general, cartridges having a tetragonal ring shape may surround edges of pouch-type secondary cells. The pouch-type secondary cells may be accommodated in inner spaces of the cartridges and may be stacked such that the pouch-type secondary cells may be arranged side by side. However, according to the above-described aspect of the present disclosure, the pouch-type secondary cells 110 may be directly placed on the upper portion of the cooling plate 200 in the battery module. Therefore, the battery module does not need cartridges.

According to this configuration, since cartridges are not used, the battery module may be easily manufactured, and the volume, weight, and manufacturing costs of the battery module may be reduced. In addition, since heat generated from each of the pouch-type secondary cells 110 is directly conducted to the cooling plate 200, cooling performance may be improved.

In addition, according to this configuration of the present disclosure, plate-shaped cooling members such as cooling fins may not be provided between the secondary cells 110 and between the cooling plate 200 and the secondary cells 110. In this case, the volume, weight, and manufacturing costs of the battery module may be further reduced, and the assemblability of the battery module may be further improved.

In addition, the cooling plate 200 may have a concave-convex structure on an upper surface thereof. That is, concave and convex portions may be formed on the upper portion of the cooling plate 200 as shown in FIGS. 2 and 3. According to this configuration of the present disclosure, each of the pouch-type secondary cells 110 may be easily placed in a standing position and stably maintained in the standing position. In addition, the secondary cells 110 and the cooling plate 200 may be more closely placed in contact with each other, and owing to an increased contact area, heat exchange efficiency may be increased between the secondary cells 110 and the cooling plate 200.

In particular, the concave and convex portions of the cooling plate 200 may correspond to a lower-side shape of the secondary cells 110. For example, referring to FIG. 3, concave portions of the cooling plate 200 may have inclined surfaces corresponding to a folded shape of the sealing portions of the secondary cells 110. In addition, the convex portions of the cooling plate 200 may have inclined surfaces that are not parallel to the ground at top portions thereof and have a slope corresponding to accommodation parts of the secondary cells 110.

Figure 4:
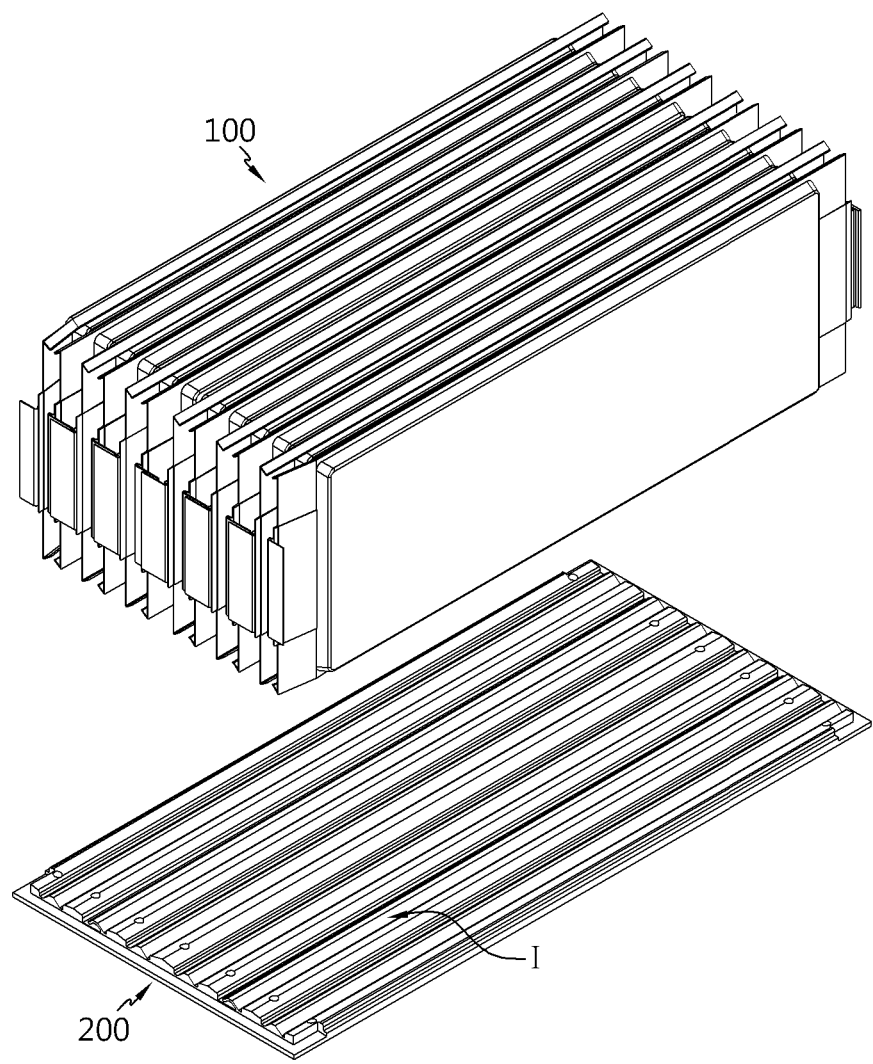
FIG. 4 is a perspective view schematically illustrating a state in which a cell assembly and a cooling plate are separated from the battery module according to an embodiment of the present disclosure.

FIG. 4 is a perspective view schematically illustrating a state in which the cell assembly 100 and the cooling plate 200 are separated from the battery module according to an embodiment of the present disclosure.

Referring to FIG. 4, a thermal interface material (TIM) may be placed between the cooling plate 200 and the cell assembly 100. In particular, the concave and convex portions may be formed on an upper surface of the cooling plate 200, and the thermal interface material may be provided on upper surfaces of the concave and convex portions as indicated by "T" in FIG. 4. Then, the cell assembly 100 may be placed on top of the cooling plate 200, and thus the thermal interface material may be placed between the cooling plate 200 and the cell assembly 100.

According to this configuration of the present disclosure, heat transfer between the secondary cells 110 and the cooling plate 200 may be increased owing to the thermal interface material. In particular, an air layer between the secondary cells 110 and the cooling plate 200 may be removed or reduced owing to the thermal interface material, and thus a larger amount of heat may be more rapidly transferred from the secondary cells 110 to the cooling plate

200. Moreover, the thermal interface material may be prepared in the form of gel and applied to the upper surface of the cooling plate 200 before the cell assembly 100 is placed on the cooling plate 200. In this case, an air layer between the secondary cells 110 and the cooling plate 200 may be more reliably removed.

In particular, the thermal interface material may include a thermal bond. According to this configuration of the present disclosure, owing to the thermal bond, heat transfer efficiency may be increased, and the coupling between the cooling plate 200 and the cell assembly 100 may be enhanced. Furthermore, when the battery module is assembled, the secondary cells 110 may be stably maintained in the standing position owing to the thermal bond, and thus the assemblability of the battery module may be further improved.

The front cover 300 may be placed in front of the cell assembly 100 to cover a front end portion of the cell assembly 100. In particular, electrode leads of the secondary cells 110 may protrude from a front side of the cell assembly 100, and thus the front cover 300 may be concave toward the front side of the cell assembly 100 to accommodate the electrode leads. For example, the front cover 300 may have a plate-like shape, and both left and right ends of the front cover 300 may be bent at approximately right angles.

The front cover 300 may protect the front side of the cell assembly 100 from external physical or chemical factors. Furthermore, the front cover 300 may include a metallic material such as steel having high rigidity. Steel is inexpensive and high mechanical strength.

In particular, a lower portion of the front cover 300 may be welded to the cooling plate 200. This will be described in more detail with reference to FIG. 5.

Figure 5:
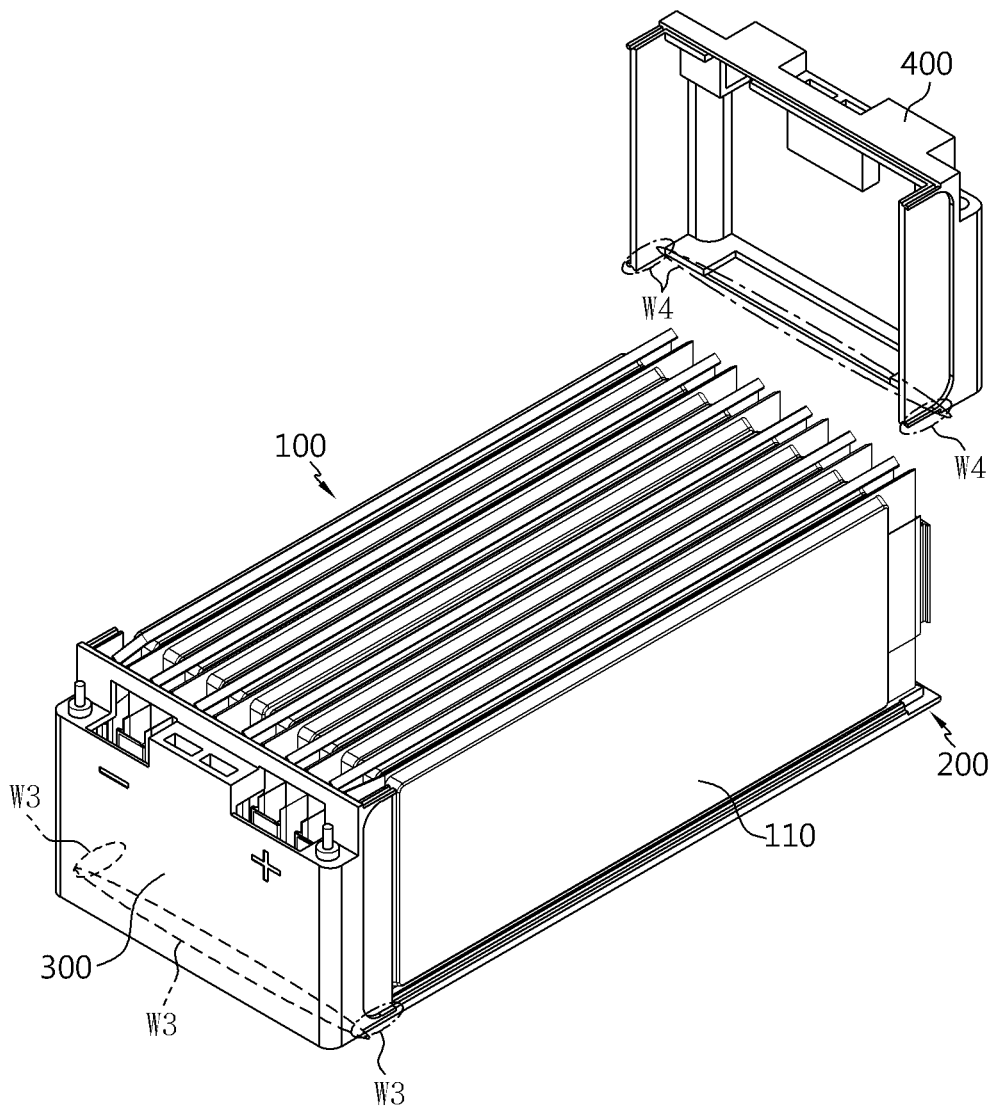
FIG. 5 is a view schematically illustrating a welded state of a front cover of the battery module, according to an embodiment of the present disclosure.

FIG. 5 is a view schematically illustrating a welded state of the front cover 300 of the battery module, according to an embodiment of the present disclosure.

Referring to FIG. 5, the front cover 300 may be placed on the front side of the cell assembly 100, and a lower end of the front cover 300 may be welded to the cooling plate 200. In particular, the front cover 300 may include bent portions at both left and right ends thereof, and welding may be performed not only on a center portion but also on both the bent portions of the front cover 300. That is, the lower end of the front cover 300 may be entirely welded to the cooling plate 200 from the left end to the right end thereof as indicated by W3 in FIG. 5. In this case, a weld line between the front cover 300 and the cooling plate 200 may have an approximate C-shape extending from the left end to the right end of the front cover 300.

According to this configuration of the present disclosure, the front cover 300 may be securely coupled to the cooling plate 200, and sealing between the front cover 300 and the cooling plate 200 may be securely guaranteed. Thus, the battery module may not need fastening members for coupling the front cover 300 to the cooling plate 200 or sealing members for sealing the interface between the front cover 300 and the cooling plate 200.

The rear cover 400 may be placed on a rear side of the cell assembly 100 to cover a rear end portion of the cell assembly 100. In particular, electrode leads of the secondary cells 110 may protrude from the rear side of the cell assembly 100. For example, as shown in FIGS. 2 and 4, the secondary cells 110 may include electrode leads having different polarities on both the front and rear sides thereof. In this case, the inner side of the rear cover 400 may be concave toward the rear side of the rear cover 400 to accommodate the electrode leads. For example, the rear cover 400 may have a plate-like shape, and both left and right ends of the rear cover 400 may be bent at about right angles.

The rear cover 400 may protect the rear side of the cell assembly 100 from external physical or chemical factors. In particular, the rear cover 400 may include a metallic material such as steel having high rigidity.

In particular, a lower portion of the rear cover 400 may be welded to the cooling plate 200. For example, as shown in FIG. 5, the rear cover 400 may be placed on a rear end portion of the cooling plate 200 in a state in which the cell assembly 100 is placed on the cooling plate 200. In this case, like the front cover 300, the rear cover 400 may have bent portions at both left and right ends thereof, and welding may be performed on both a central portion and the bent portions of the rear cover 400. That is, a lower end of the rear cover 400 may be entirely welded to the cooling plate 200 from the left end to the right end thereof as indicated by W4 in FIG. 5. In this case, as in the front cover 300, a weld line between the rear cover 400 and the cooling plate 200 may have an approximate C-shape extending from the left end to the right end of the rear cover 400.

According to this configuration of the present disclosure, the rear cover 400 may be securely coupled to the cooling plate 200, and sealing between the rear cover 400 and the cooling plate 200 may be securely guaranteed. Thus, the battery module may not need fastening members for coupling the rear cover 400 to the cooling plate 200 or sealing members for sealing the interface between the rear cover 400 and the cooling plate 200.

The left side cover 500 may be placed on a left side of the cell assembly 100 to cover the left side of the cell assembly 100. In particular, a flat surface of an outermost secondary cell 110 of the cell assembly 100 may be located on the left side of the cell assembly 100, and thus the left side cover 500 may have a plate-like shape. For example, the left side cover 500 may have an approximately rectangular shape as shown in FIG. 2.

In particular, the left side cover 500 may be welded to the cooling plate 200, the front cover 300, and the rear cover 400. This will be described in more detail with reference to FIG. 6.

Figure 6:
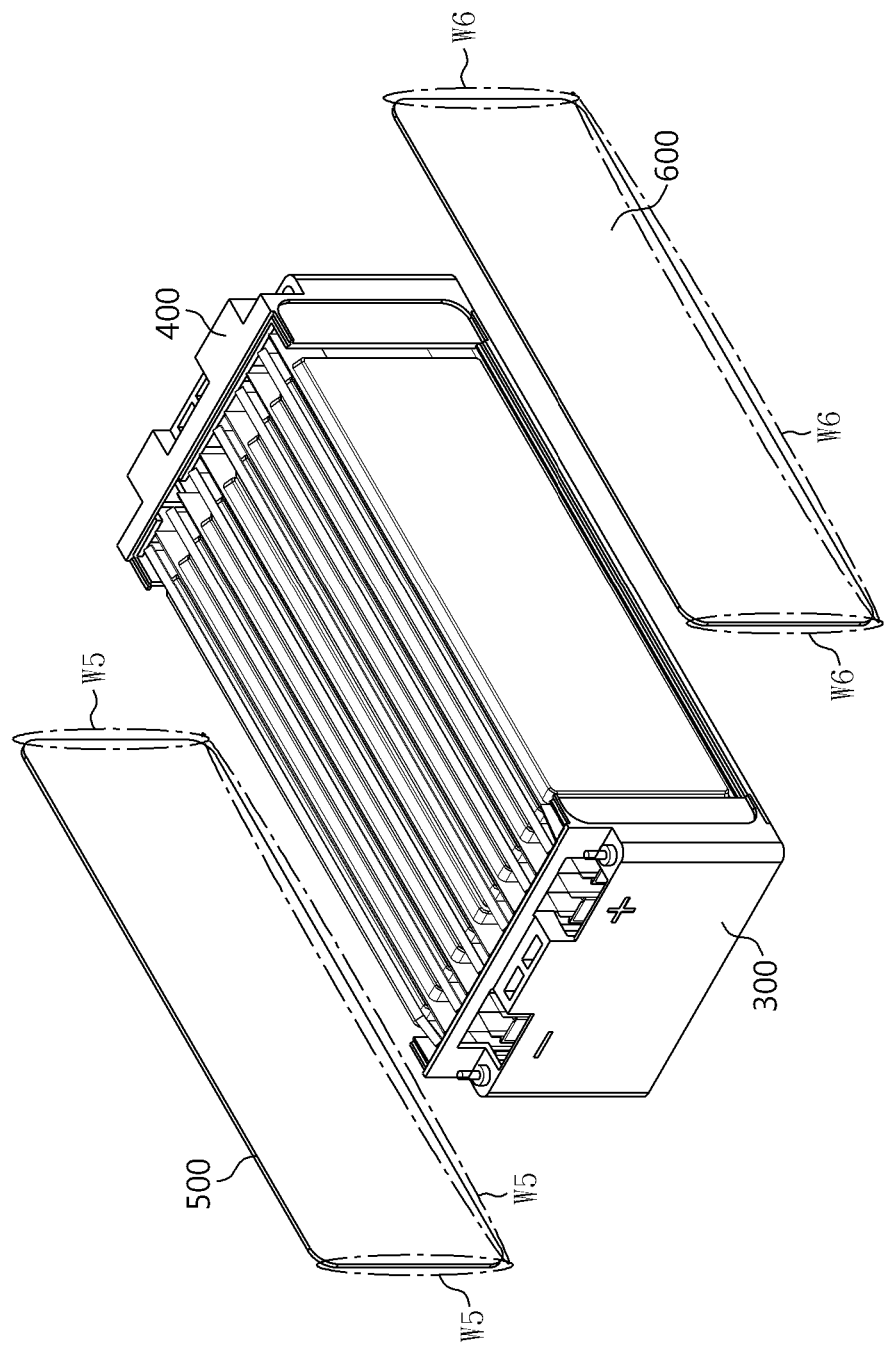
FIG. 6 is a view schematically illustrating a coupling structure of side covers in the battery module according to an embodiment of the present disclosure.

FIG. 6 is a view schematically illustrating a coupling structure of the side covers 500 and 600 in the battery module according to an embodiment of the present disclosure.

Referring to FIG. 6, in a state in which the cell assembly 100 is placed on the cooling plate 200 and the front cover 300 and the rear cover 400 are welded to the cooling plate 200, the left side cover 500 may be placed toward the left side of the cell assembly 100 as indicated by an arrow. Thereafter, a lower end portion of the left side cover 500 may be placed on the upper portion of the cooling plate 200, and front and rear end portions of the left side cover 500 may be respectively brought into contact with the front cover 300 and the rear cover 400. Then, the left side cover 500 may be welded to the cooling plate 200, the front cover 300, and the rear cover 400 along contact portions therebetween. That is, as indicated by W5 in FIG. 6, the lower end portion of the left side cover 500 may be welded to a left side portion of the cooling plate 200, the front end portion of the left side cover 500 may be welded to a left side portion of the front cover 300, and the rear end portion of the left side cover 500 may be welded to a left side portion of the rear cover 400.

According to this configuration of the present disclosure, the left side cover 500 may be stably fixedly coupled to the cooling plate 200, the front cover 300, and the rear cover 400, and sealing may be guaranteed therebetween. Therefore, the battery module may not need fastening members for fixing the left side cover 500 or fixing a lateral side of the battery module, and sealing members for sealing edge portions of the left side cover 500.

The right side cover 600 may be placed on a right side of the cell assembly 100 to cover the right side of the cell assembly 100. In particular, as in the case of the left side of the cell assembly 100, a flat surface of a secondary cell 110 may be located on the right side of the cell assembly 100, and thus the right side cover 600 may also have a plate-like shape. For example, as shown in FIG. 6, the right side cover 600 may have an approximately rectangular plate shape.

In particular, the right side cover 600 may be welded to the cooling plate 200, the front cover 300, and the rear cover 400. That is, a lower end portion of the right side cover 600 may be placed on the upper portion of the cooling plate 200, and front and rear end portions of the right side cover 600 may be respectively brought into contact with the front cover 300 and the rear cover 400. Then, as indicated by W6 in FIG. 6, the right side cover 600 may be welded along the contact portions. That is, the lower end portion of the right side cover 600 may be welded to a right side portion of the cooling plate 200, the front end portion of the right side cover 600 may be welded to a right side portion of the front cover 300, and the rear end portion of the right side cover 600 may be welded to a right side portion of the rear cover 400.

According to this configuration of the present disclosure, the right side cover 600 may be stably coupled to the cooling plate 200, the front cover 300, and the rear cover 400 with stably sealing therebetween, and separate fastening members or sealing members may not be used.

The side covers 500 and 600 may protect lateral sides of the cell assembly 100 from external physical or chemical factors. That is, the left side cover 500 may protect the left side of the cell assembly 100, and the right side cover 600 may protect the right side of the cell assembly 100. In particular, the left side cover 500 and the right side cover 600 may include a metallic material such as steel having rigidity.

The upper plate 700 may be placed on an upper portion of the cell assembly 100 to cover the upper portion of the cell assembly 100. In particular, the upper plate 700 may have a plate-like shape. For example, as shown in FIG. 2, the upper plate 700 may have an approximately rectangular shape.

The upper plate 700 may protect the upper portion of the cell assembly 100 from external physical or chemical factors. In particular, the upper plate 700 may include a metallic material such as steel having high rigidity.

In particular, the upper plate 700 may be welded to the left side cover 500 and the right side cover 600. This will be described in more detail with reference to FIG. 7.

Figure 7:
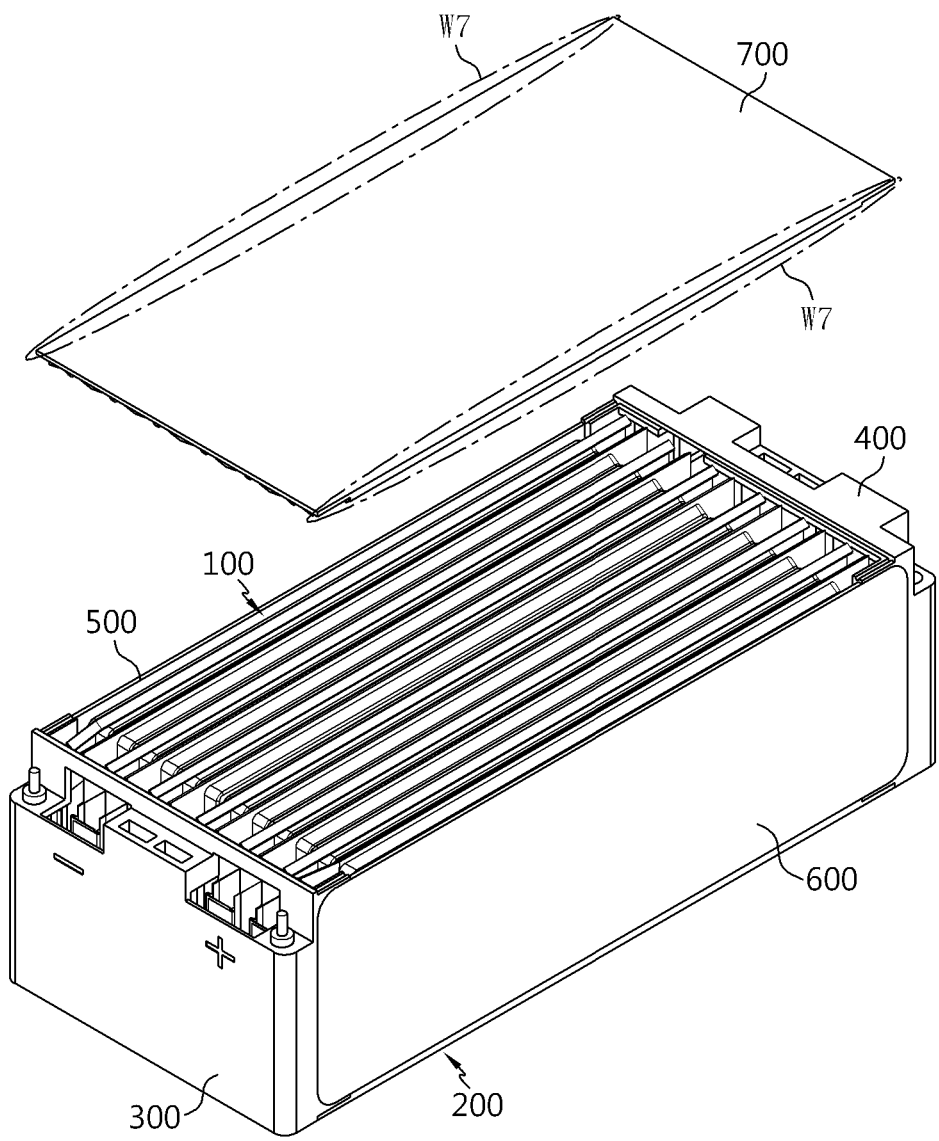
FIG. 7 is a view schematically illustrating a coupling structure of the side covers in the battery module according to an embodiment of the present disclosure.

FIG. 7 is a view schematically illustrating a coupling structure of the upper plate 700 in the battery module according to an embodiment of the present disclosure.

Referring to FIG. 7, as indicated by an arrow, the upper plate 700 may be moved downward toward the cell assembly 100 and placed on the upper portion of the cell assembly 100. In particular, left and right sides of the upper plate 700 may be respectively brought into contact with and welded to the left side cover 500 and the right side cover 600. That is, as indicated by W7 in FIG. 7, a left end portion of the upper plate 700 may be welded to the left side cover 500, and a right end portion of the upper plate 700 may be welded to the right side cover 600.

Therefore, the upper plate 700 may be stably fixed to the battery module, and an upper portion of the battery module may be securely sealed. In the present embodiment, it is described that the upper plate 700 is welded to only the left side cover 500 and the right side cover 600. However, the upper plate 700 may be welded to the front cover 300 and/or the rear cover 400.

The upper plate 700 may have a concave-convex structure on a lower surface thereof. That is, like the concave and convex portions formed on the upper portion of the cooling plate 200, concave and convex portions may be formed on a lower portion of the upper plate 700 as shown in FIG. 3. In this case, the standing position of the pouch-type secondary cells 110 provided in the cell assembly 100 may be more stably maintained, and even when the battery module is impacted or moved, relative movement of the secondary cells 110 may be limited, thereby effectively preventing the secondary cells 110 and connection parts between the secondary cells 110 from being damaged. In particular, the concave and convex portions of the upper plate 700 may correspond to an upper-side shape of the secondary cells 110. For example, as shown in FIG. 3, the concave portions of the upper plate 700 may have inclined surfaces corresponding to the folded shape of the sealing portions of the secondary cells 110. In addition, the convex portions of the upper plate 700 may have inclined surfaces having a slope corresponding to the accommodation parts of the secondary cells 110.

Preferably, at least some of the cooling plate 200 the front cover 300, the rear cover 400, the left side cover 500, the right side cover 600, and the upper plate 700 may be welded to each other by a friction stir welding method.

In particular, according to an aspect of the present disclosure, weld zones of all the listed parts of the battery module may be formed by the friction stir welding method. For example, as indicated by W3 and W4 in FIG. 5, friction stir welding may be performed on coupling portions between the front cover 300 and the cooling plate 200 and coupling portions between the rear cover 400 and the cooling plate 200. In addition, as indicated by W5 in FIG. 6, friction stir welding may be performed between the left side cover 500 and the cooling plate 200, between the left side cover 500 and the front cover 300, and between the left side cover 500 and the rear cover 400. In addition, as indicated by W6 in FIG. 6, friction stir welding may be performed between the right side cover 600 and the cooling plate 200, between the right side cover 600 and the front cover 300, and between the right side cover 600 and the rear cover 400. In addition, as indicated by W7 in FIG. 7, friction stir welding may be performed between the upper plate 700 and the left side cover 500 and between the upper plate 700 and the right side cover 600.

According to this configuration of the present disclosure, inner components of the battery module may not be damaged or broken by heat or deformation during a welding process. That is, if the amount of heat applied to the pouch-type secondary cells 110 of the cell assembly 100 is equal to or greater than a certain value, parts such as the pouch-type cases, electrode plates, or separators of the pouch-type secondary cells 110 may be damaged. However, since the friction stir welding method uses a relatively small amount of heat compared to other welding methods, the secondary cells 110 may not be damaged.

In addition, compared to fusion welding methods, the friction stir welding method results in less residual stress and thermal deformation, and thus mechanical characteristics of weld zones may be improved. For example, the friction stir welding method guarantees about 90% of the original strength of base metals. Therefore, according to this aspect of the present disclosure, the coupling strength between the cooling plate 200, the front cover 300, the rear cover 400, the left side cover 500, the right side cover 600, and the upper plate 700, which form a case of the battery module, may be stably guaranteed.

Furthermore, according to this configuration of the present disclosure, the battery module may be more efficiently sealed. That is, in a friction stir welding process, two base metals may be mixed and welded together, thereby guaranteeing high hermeticity and high sealing performance. Therefore, in this case, sealing performance may be stably guaranteed even though sealing parts such as O-rings or rubber pads are not placed between the components forming the case of the battery module.

Furthermore, according to this configuration of the present disclosure, although the components forming the case of the battery module include different metallic materials, welding strength may be stably maintained. In particular, the cooling plate 200 may include an aluminum-containing material having high thermal conductivity, and the left side cover 500, the right side cover 600, the front cover 300, and the rear cover 400 may include a steel-containing material to increase the rigidity of the battery module. In this case, a dissimilar welding process may be performed between the cooling plate 200 and other components, and the friction stir welding method may guarantee high weldability even in the dissimilar welding process. For example, when a fusion welding method such as laser welding method is applied to aluminum-steel welding, compounds such as inter metallic compound (IMC) may be formed, and thus welding strength may be decreased. However, if the friction stir welding method is used, since two base metals are bonded together using friction without melting the two base metals, the welding strength between the cooling plate 200 and other components may not be substantially decreased but may be stably maintained.

Furthermore, this configuration of the present disclosure allows for a butt welding method in which two plates are welded together without having to overlapping the two plates. For example, sections of a side cover and the cooling plate 200 or the upper plate 700 may be welded to each other using the friction stir welding method by bringing edges thereof in contact with each other instead of overlapping end portions thereof. In addition, a side cover and the front cover 300 or the rear cover 400 may also be welded to each other in a state in which edges thereof are in contact with each other instead of end portions thereof overlapping each other. In this case, the friction stir welding method may also be suitable. According to this configuration of the present disclosure, the volume of the battery module may be reduced, and the energy density of the battery module may be increased.

In addition, preferably, the left side cover 500 and/or the right side cover 600 may be welded to at least one of the front cover 300, the rear cover 400, the cooling plate 200, and the upper plate 700 by continuously bringing edges thereof into contact with each other and welding the edges together.

For example, referring to the configuration shown FIG. 6, a front edge of the left side cover 500 may be brought into contact with a left edge of the front cover 300, and the contact edges may be welded to each other. In this case, the front edge of the left side cover 500 and the left edge of the front cover 300 may be continuously in contact with each other in a form extending from an upper end to a lower end thereof. That is, among weld zones of the left side cover 500 indicated by W5, a front end weld zone of the left side cover 500 may be welded to the front cover 300, and the front end weld zone of the left side cover 500 may have a shape continuously extending from an upper end to a lower end of the left side cover 500.

Furthermore, in a similar manner, a lower edge of the left side cover 500 may be continuously brought into contact with a left edge of the cooling plate 200 and welded thereto. In this case, a lower end weld zone of the left side cover 500 may be continuously formed in a shape extending from a front end to a rear end of the left side cover 500.

In addition, similarly, a rear edge of the left side cover 500 may be continuously brought into contact with a left edge of the rear cover 400 and welded thereto. In this case, a rear end weld zone of the left side cover 500 may be continuously formed in a shape extending from the upper end to the lower end of the left side cover 500.

In addition, similarly, an upper edge of the left side cover 500 may be continuously brought into contact with a left edge of the upper plate 700 and welded thereto. In this case, an upper end weld zone of the left side cover 500 may be continuously formed in a shape extending from the front end to the rear end of the left side cover 500.

In addition, like the left side cover 500, the right side cover 600 may be welded to at least one of the front cover 300, the rear cover 400, the cooling plate 200, and the upper plate 700 by continuously bringing edges thereof into contact with each other and welding the edges together.

For example, a front edge, a lower edge and/or a rear edge of the right side cover 600 may be continuously brought into contact with right edges of the front cover 300, the cooling plate 200, and/or the rear cover 400, and may be welded thereto. In this case, a front end weld zone, a lower end weld zone, and/or a rear end weld zone of the right side cover 600 may be continuously formed in a shape extending from an upper end to a lower end of the right side cover 600 or from a front end to a rear end of the right side cover 600.

According to this configuration of the present disclosure, since weld zones are formed in an elongated shape, the hermeticity of the battery module may be improved, and the coupling strength between the components of the case of the battery module may be increased. Furthermore, in this case, continuity may be guaranteed in a welding process, and the welding process may be easily performed.

More preferably, weld zones of the left side cover 500 and/or the right side cover 600 with at least one of the front cover 300, the rear cover 400, the cooling plate 200, and the upper plate 700 may be formed in a continuous straight line shape from one end to the other end.

For example, referring to FIG. 6, the front end weld zone of the left side cover 500 formed between the left side cover 500 and the front cover 300 may have a straight line shape continuously extending from the upper end to the lower end of the left side cover 500.

In addition, the lower end weld zone of the left side cover 500 formed between the left side cover 500 and the cooling plate 200 may have a straight line shape continuously extending from the front end to the rear end of the left side cover 500.

In addition, the rear end weld zone of the left side cover 500 formed between the left side cover 500 and the rear cover 400 may have a straight line shape continuously extending from the upper end to the lower end of the left side cover 500.

In addition, the upper end weld zone of the left side cover 500 formed between the left side cover 500 and the upper plate 700 may have a straight line shape continuously extending from the front end to the rear end of the left side cover 500.

In addition, like the left side cover 500, the front end weld zone, the lower end weld zone, the upper end weld zone, and/or the rear end weld zone of the right side cover 600 may have a straight line shape continuously extending from the upper end to the lower end of the right side cover 600 or from the front end to the rear end of the right side cover 600.

According to this configuration of the present disclosure, each weld zone for welding two components of the case of the battery module to each other may be formed in a straight line shape, and thus a welding process may be smoothly performed. In particular, when components are welded together by the friction stir welding method, a probe of a welding unit may be inserted and moved between bonding surfaces between the components. In this case, if a weld zone is formed in a straight line shape as described above, the probe may move linearly, and thus the welding process may be effectively performed.

Alternatively, each of the weld zones of the left side cover 500 and the right side cover 600 formed with at least one of the front cover 300, the rear cover 400, the cooling plate 200, and the upper plate 700 may be discontinuous from one end to the other end thereof.

For example, the front end weld zone, the lower end weld zone, and/or the rear end weld zone of the left side cover 500 and/or the front end weld zone, the lower end weld zone, and/or the rear end weld zone of the right side cover 600 that are formed with the front cover 300, the cooling plate 200, and the rear cover 400 may have a discontinuous shape formed by a plurality of weld points. According to this configuration of the present disclosure, weld zones may have small sizes, and thus the process time of welding may be reduced.

In addition, preferably, front end weld lines, rear end weld lines, upper end weld lines, and lower end weld lines of the left side cover 500 and the right side cover 600 may be formed in a ring shape. This will be described in more detail with reference to FIG. 8.

Figure 8:
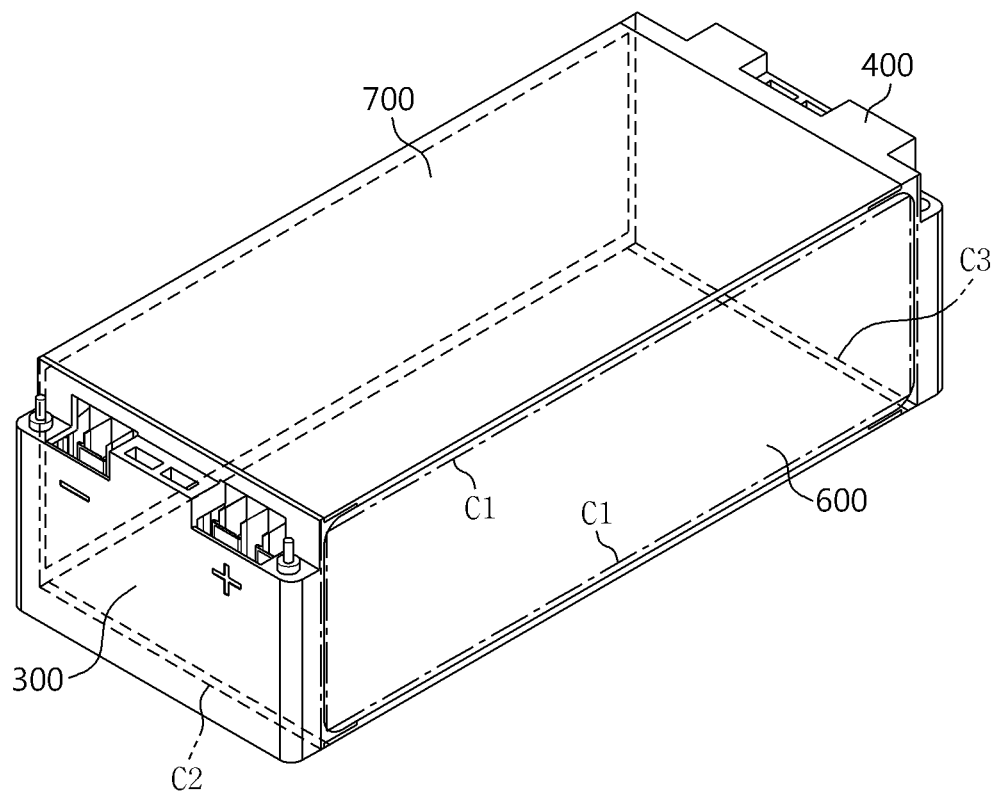
FIG. 8 is a view schematically illustrating weld zones of the battery module according to an embodiment of the present disclosure.

FIG. 8 is a view schematically illustrating weld zones of the battery module according to an embodiment of the present disclosure. In FIG. 8, for clarity of description, visible weld zones are indicated with one-dot chain lines, and invisible weld zones are indicated with broken lines (hidden lines).

Referring to FIG. 8, a front end line of the right side cover 600 may be entirely welded to the front cover 300, and a rear end line of the right side cover 600 may be entirely welded to the rear cover 400. In addition, an upper end line of the right side cover 600 may be entirely welded to the upper plate 700, and a lower end line of the right side cover 600 may be entirely welded to the cooling plate 200. In addition, the four weld lines may be connected at both ends thereof, and thus a ring shape may be formed. That is, the weld lines of the right side cover 600 may be formed in a substantially tetragonal ring shape along edges of the right side cover 600 as indicated by C1 in FIG. 8.

In addition, like the right side cover 600, weld lines of the left side cover 500 may be formed in a substantially tetragonal ring shape along edges of the left side cover 500. That is, upper and lower end lines of the left side cover 500 may be entirely welded to the upper plate 700 and the cooling plate 200, and front and rear end lines of the left side cover 500 may be entirely welded to the front cover 300 and the rear cover 400.

According to this configuration of the present disclosure, no gap is formed in joint portions between the side covers 500 and 600 and other components, thereby guaranteeing sealing along the side covers 500 and 600 of the battery module. Therefore, permeation of moisture or foreign substances through peripheral regions of the side covers 500 and 600 may be effectively prevented, and gas generated inside the battery module may not be easily discharged. In addition, the battery module may be easily cooled.

In addition, as indicated by C2 in FIG. 8, a lower end line of the front cover 300 may be entirely welded to the cooling plate 200. In addition, as indicated by C3 in FIG. 3, a lower end line of the rear cover 400 may also be entirely welded to the cooling plate 200. In this case, an end of a lower end line of the left side cover 500 may be connected to a line C2, and the other end of the lower end line of the left side cover 500 may be connected to a line C3. In addition, the lower end line of the right side cover 600 may also be connected to the line C2 and the line C3. In this case, a lower side of the battery module may be entirely welded along edges of the cooling plate 200. For example, if the cooling plate 200 has an approximately tetragonal plate shape, weld zones of the cooling plate 200 welded to other components may form an approximately tetragonal ring shape.

According to this configuration of the present disclosure, bonding and sealing properties of a lower portion of the battery module may be improved. In particular, when the battery module is mounted on a vehicle or the like, the lower portion of the battery module may be exposed to the outside. In this case, since lower lines of the battery module are entirely sealed as described above, permeation of moisture or foreign substances through the lower side of the battery module may be effectively prevented.

In this configuration, welding between the cooling plate 200 and the front cover 300 and between the cooling plate 200 and the rear cover 400 may be performed from the lower side of the battery module. However, the present disclosure is not limited to this embodiment.

In addition, all the cooling plate 200, the front cover 300, the rear cover 400, the left side cover 500, the right side cover 600, and the upper plate 700 may include metallic materials. In particular, the cooling plate 200 may include a material having relatively high thermal conductivity compared to the other components. However, except for the cooling plate 200, the other components, that is, the front cover 300, the rear cover 400, the left side cover 500, the right side cover 600, and the upper plate 700 may include a material having high rigidity. Preferably, the cooling plate 200 may include an aluminum-containing material, and the front cover 300, the rear cover 400, the left side cover 500, the right side cover 600, and the upper plate 700 may include a steel-containing material.

According to this configuration of the present disclosure, the rigidity of the battery module may be equal to or higher than a certain degree, and the cooling efficiency of the battery module may also be high. In particular, the battery module of the present disclosure may be mounted on a lower portion of a vehicle with the upper plate 700 facing the inside of the vehicle and the cooling plate 200 facing the outside of the vehicle. In this case, since the cooling plate 200 includes a material having higher thermal conductivity than the other components of the case, heat may be effectively dissipated through the cooling plate 200. In addition, if a cooling fluid such as air or water flows along the lower portion of the battery module, heat may be discharged from the inside of the battery module to the cooling fluid through the cooling plate 200 located on the lower portion of the battery module.

In addition, an insulative coating layer including an electrically insulative material may be formed on at least a portion of an inner surface of at least one of the front cover 300, the rear cover 400, the left side cover 500, the right side cover 600, and the upper plate 700. Alternatively, an insulative sheet including an electrically insulative material may be provided on at least a portion of the inner surface of at least one of the front cover 300, the rear cover 400, the left side cover 500, the right side cover 600, and the upper plate 700.

According to this configuration of the present disclosure, although the front cover 300, the rear cover 400, the left side cover 500, the right side cover 600 and/or the upper plate 700 include a metallic material, the cell assembly 100 may be stably insulated.

Particularly, in the configuration in which the insulative coating layer or the insulative sheet is provided, the front cover 300, the rear cover 400, the left side cover 500, the right side cover 600, and the upper plate 700 may be welded by the above-described friction stir welding method. In the friction stir welding method, a large amount of heat is not generated, and thus the insulative coating layer or the insulative sheet may not be broken. Therefore, in this case, the insulation of the battery module may be stably maintained.

In addition, preferably, at least one of the front cover 300 and the rear cover 400 may include a stepped portion. This will be described in more detail with reference to FIG. 9.

Figure 9:
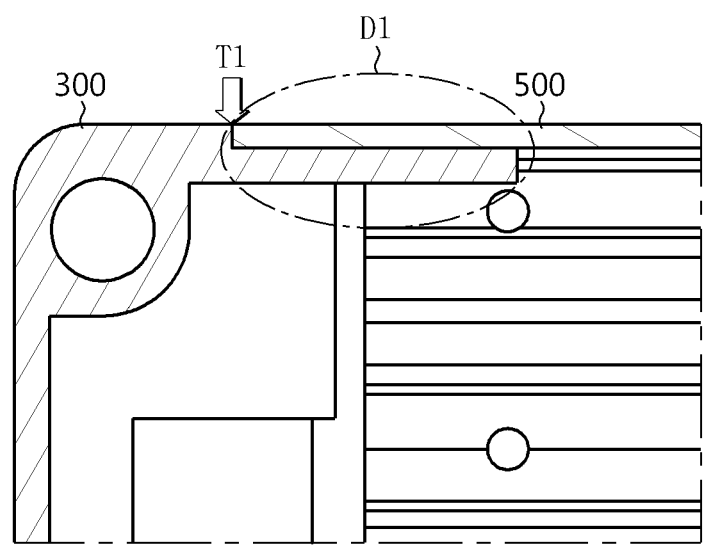
FIG. 9 is a partial cross-sectional view taken along line A2-A2' of FIG. 1.

FIG. 9 is a partial cross-sectional view taken along line A2-A2' of FIG. 1. That is, FIG. 9 illustrates a portion of a horizontal cross-section of the battery module viewed from above, particularly, a left corner portion of the front cover 300 on an enlarged scale, according to an embodiment of the present disclosure.

Referring to FIG. 9, a stepped portion having an inwardly recessed shape may be formed on a left end portion, particularly, a left bent portion of the front cover 300 as indicated by D1. In addition, the front end portion of the left side cover 500 may be placed on a recessed portion formed by the stepped portion. That is, the front end portion of the left side cover 500 having a plate shape may be placed on the recessed portion by inwardly inserting the front end portion of the left side cover 500 from the outside of the battery module. In this case, the step portion of the front cover 300 may have a size equal to or similar to the thickness of the left side cover 500. In this case, an outer surface of the front cover 300 and an outer surface of the left side cover 500 may form a single flat surface.

Similarly, a stepped portion having an inwardly recessed shape may be formed on a right end portion of the front cover 300, and the front end portion of the right side cover 600 may be inserted into the stepped portion in an outside-to-inside direction.

According to this configuration of the present disclosure, the side covers 500 and 600 may be easily assembled to the front cover 300. In particular, assembling positions of the side covers 500 and 600 may be guided by the stepped portions of the front cover 300 and thus the front cover 300 and the side covers 500 and 600 may be more easily assembled.

In addition, according to this configuration of the present disclosure, the rigidity of the battery module may be enhanced. That is, since the front cover 300 is placed on inner sides of the front end portions of the side covers 500 and 600, although force is applied to the side covers 500 and 600 from the outside, the front cover 300 may support the side covers 500 and 600 in an outward direction.

Furthermore, according to this configuration of the present disclosure, friction stir welding may be more easily performed. Particularly, referring to a region indicated by an arrow T1, in a friction stir welding process, a probe of a welding unit may be brought into contact with and inserted between bonding surfaces of the front cover 300 and the left side cover 500 while the probe is rotated, and during this process, force may be applied to the vicinity of the bonding surfaces of the front cover 300 and the left side cover 500 in an inward direction as indicated by the arrow T1. At this time, according to the configuration of the present disclosure, a portion D1 formed by the stepped portion of the front cover 300 may support pressure applied in the direction indicated by the arrow T1. Therefore, the configuration of the present disclosure in which stepped portions are formed may be more preferably applied to the case in which a friction stir welding process is performed between the front cover 300 and the left side cover 500.

In addition, although FIG. 9 illustrates only the front cover 300, stepped portions may also be formed on the rear cover 400 in a similar manner such that the rear end portion of the left side cover 500 and the rear end portion of the right side cover 600 may be placed on the stepped portions of the rear cover 400 by outside-to-inside insertion motions. For example, a stepped portion may be formed on a left end portion of the rear cover 400 in a shape symmetrical to the stepped portion of the front cover 300 shown in FIG. 9 in a front-to-rear direction (in FIG. 9, in a left-to-right direction). In addition, a stepped portion may be formed on a right end portion of the rear cover 400 such that the rear end portion of the right side cover 600 may be inserted into and placed on the stepped portion.

In addition, preferably, at least one of the cooling plate 200 and the upper plate 700 may include a stepped portion. This will be described in more detail with reference to FIGS. 10 and 11.

Figure 10:
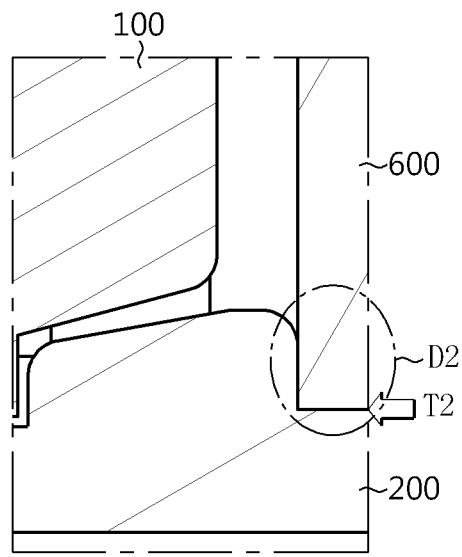
FIG. 10 is an enlarged view illustrating a portion B1 of FIG. 3.
Figure 11:
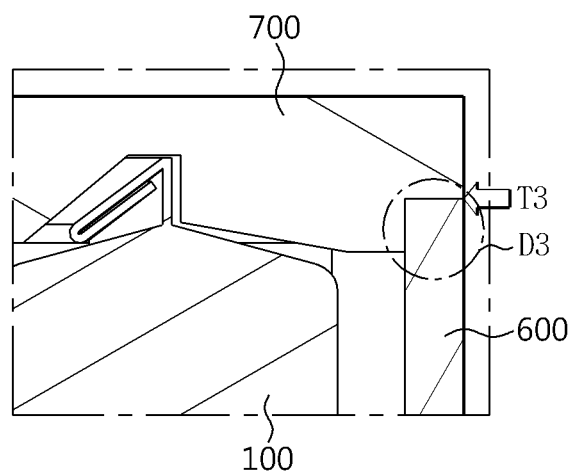
FIG. 11 is an enlarged view illustrating a portion B3 of FIG. 3.

FIGS. 10 and 11 are enlarged views illustrating portions B1 and B2 of FIG. 3, respectively.

First, referring to FIG. 10, a stepped portion having an inwardly recessed shape may be formed on a right end portion of the cooling plate 200 as indicated by D2. In addition, the lower end portion of the right side cover 600 may be placed on a recessed portion formed by the stepped portion by inwardly inserting the lower end portion of the right side cover 600 from the outside. At this time, the stepped portion formed on the cooling plate 200 may have a size corresponding to the thickness of the right side cover 600.

Similarly, a stepped portion having an inwardly recessed shape may be formed on a left end portion of the cooling plate 200 so as to receive the lower end portion of the left side cover 500.

According to this configuration of the present disclosure, the cooling plate 200 and the side covers 500 and 600 may be easily assembled. That is, since assembling positions of the side covers 500 and 600 are guided by the stepped portions of the cooling plate 200, the cooling plate 200 and the side covers 500 and 600 may be more easily assembled.

In addition, according to this configuration of the present disclosure, the rigidity of the battery module may be enhanced. That is, since the cooling plate 200 is placed between the lower end portions of the side covers 500 and 600, although horizontal force is applied from the outside of the side covers 500 and 600, the cooling plate 200 may support the side covers 500 and 600 in outward directions. In addition, the stepped portions of the cooling plate 200 may also support the side covers 500 and 600 in an upward direction. Furthermore, according to this configuration of the present disclosure, a friction stir welding process may be more easily performed. Particularly, referring to a region indicated by an arrow T2, in a friction stir welding process, a probe of a welding unit may be brought into contact with and inserted between bonding surfaces of the cooling plate 200 and the right side cover 600, and during this process, force may be applied in an inward direction as indicated by the arrow T2. However, according to the configuration of the present disclosure, a portion D2 formed by the stepped portion of the cooling plate 200 may support pressure applied in the direction indicated by the arrow T2.

Next, referring to FIG. 11, as indicated by D3, a stepped portion having an inwardly recessed shape may be formed on the right end portion of the upper plate 700. In addition, an upper end portion of the right side cover 600 may be brought into contact with the stepped portion of the upper plate 700 by inwardly inserting the upper end portion of the right side cover 600 from the outside. In addition, similarly, a stepped portion having, an inwardly recessed shape may be formed on the left end portion of the upper plate 700, and an upper end portion of the left side cover 500 may be inserted into the stepped portion of the upper plate 700.

This configuration of the present disclosure may be advantageous like the configuration in which stepped portions are formed on the cooling plate 200. That is, according to this configuration, the upper plate 700 and the side covers 500 and 600 may be easily assembled, and the rigidity of the battery module may be enhanced. In addition, according to this configuration, a friction stir welding process may be easily performed between the upper plate 700 and the side covers 500 and 600.

In addition, preferably, all joining portions (bonding surfaces) of the left side cover 500 and/or the right side cover 600 to be jointed to (bonded to) the front cover 300, the rear cover 400, the cooling plate 200, and the upper plate 700 may be exposed at lateral sides of the battery module.

For example, referring to the configuration shown in FIG. 9, bonding surfaces of the left side cover 500 and the front cover 300 may be approximately perpendicular to the outer surfaces of the left side cover 500 and the front cover 300. In this case, open sides (indicated by T1) of the bonding surfaces of the left side cover 500 and the front cover 300 may face a right side of the battery module (on an upper side in FIG. 9).

In addition, referring to the configuration shown in FIG. 10, bonding surfaces of the right side cover 600 and the cooling plate 200 may be approximately perpendicular to an outer surface of the right side cover 600, that is, the outer surface of the battery module. In this case, open sides (indicated by T2) of the bonding surfaces of the right side cover 600 and the cooling plate 200 may face a right side of the battery module (on a right side in FIG. 9).

In addition, referring to the configuration shown in FIG. 11 bonding surfaces of the right side cover 600 and the upper plate 700 may be approximately perpendicular to the outer surface of the right side cover 600. In this case, open sides (indicated by T3) of the bonding surfaces of the right side cover 600 and the upper plate 700 may face the right side of the battery module.

According to the present embodiment, all open sides of joining portions (bonding surfaces) of the left side cover 500 and the right side cover 600 to be jointed to (bonded to) other components are exposed at lateral sides of the battery module, and thus a welding process, particularly, a friction stir welding process may be smoothly performed. For example, according to this configuration, while a probe of a welding unit is horizontally moved forward from the left or right side of the battery module, the probe may be inserted into the open sides of the joint portions as indicated by arrows T1 to T3 in FIGS. 9 to 11. In addition, after a welding process is performed as described above, the probe of the welding unit may be moved away from the battery module in a horizontal direction. Therefore, there is no structure that interferes with the process of inserting and moving the probe of the welding unit between the bonding surfaces, and thus the welding process may be efficiently performed.

However, if the open sides of the bonding surfaces, that is, welding portions, are exposed at the upper side or lower side of the battery module, insertion and movement of the welding unit occur in a vertical direction. In this case, however, it may be difficult to smoothly perform processes because of other structures.

Furthermore, the open sides of the bonding surfaces that will be welded together may be exposed to the right side or left side of the battery module rather than the front side or rear side of the battery module. Electrode leads may be located on the front end or rear end of the battery module, and according to this configuration, such electrode leads may not be damages or may not interfere with other structures or parts.

Meanwhile, the left side cover 500 and/or the right side cover 600 may have chamfered corners (edges). That is, each of the side covers 500 and 600 may have a tetragonal plate shape having four sides, and all four corners of the tetragonal plate shape at which two sides meet each other may be rounded. For example, corners of the side covers 500 and 600 may be curved with a radius equal to or greater than 10 mm.

According to this configuration of the present disclosure, a friction stir welding process may be performed with improved processability. That is, if corners are rounded with a radius equal to or greater than a certain value, edges of the side covers 500 and 600 may be continuously welded, and thus weld lines may be formed in a ring shape.

According to the present disclosure, the case (module case) of the battery module may include the cooling plate 200, the front cover 300, the rear cover 400, the left side cover 500, the right side cover 600, and the upper plate 700. In this case, the components of the module case may be coupled to each other by welding as described above. In this case, the sequence of welding may be variously implemented.

For example, when the cell assembly 100 is placed on an upper end of the cooling plate 200 as shown in FIG. 4, the front cover 300 and the rear cover 400 may be brought into contact with the cooling plate 200 respectively from the front end portion and the rear end portion of the cell assembly 100 as shown in FIG. 5 and may then be welded to the cooling plate 200. Next, as shown in FIG. 6, the left side cover 500 and the right side cover 600 may be placed on the lateral sides of the cell assembly 100 and may then be welded to the cooling plate 200, the front cover 300, and the rear cover 400. Thereafter, as shown in FIG. 7, the upper plate 700 may be placed on the upper portion of the cell assembly 100 and may then be welded to the left side cover 500 and the right side cover 600.

Figure 12:
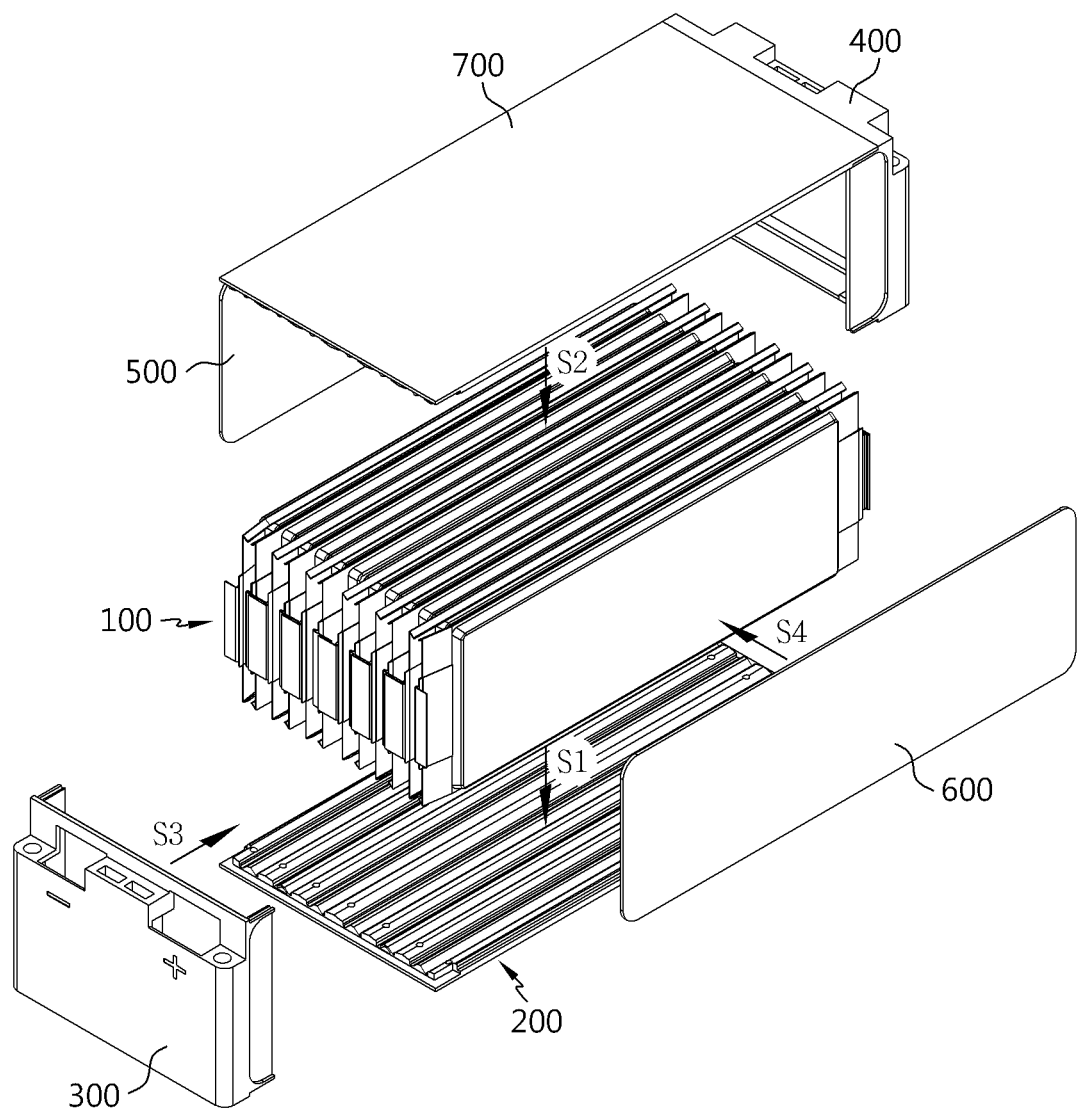
FIG. 12 is an exploded perspective view schematically illustrating a welding configuration of the battery module according to another embodiment of the present disclosure.

FIG. 12 is an exploded perspective view schematically illustrating a welding configuration of the battery module according to another embodiment of the present disclosure.

Referring to FIG. 12, the cell assembly 100 may be placed on the upper portion of the cooling plate 200 as indicated by an arrow S1. Next, an assembly of the upper plate 700, the left side cover 500, and the rear cover 400 may be coupled to the cell assembly 100 in a downward direction as indicated by an arrow S2. In this case, the assembly of the upper plate 700, the left side cover 500, and the rear cover 400 may be previously prepared by welding the upper plate 700, the left side cover 500, and the rear cover 400 to each other. In particular, the assembly may be prepared by the friction stir welding method.

Next, the front cover 300 may be placed on the front end portion of the cell assembly 100 as indicated by an arrow S3 and may then be welded to the cooling plate 200 and the left side cover 500. Thereafter, the right side cover 600 may be placed on the right side of the cell assembly 100 as indicated by an arrow S4 and may then be welded to the cooling plate 200, the front cover 300, the rear cover 400, and the upper plate 700.

According to the present disclosure, the battery module may further include a heat shield between the cell assembly 100 and a weld zone of at least one of the cooling plate 200, the front cover 300, the rear cover 400, the left side cover 500, the right side cover 600 and the upper plate 700. This will be described in more detail with reference to FIG. 13.

Figure 13:
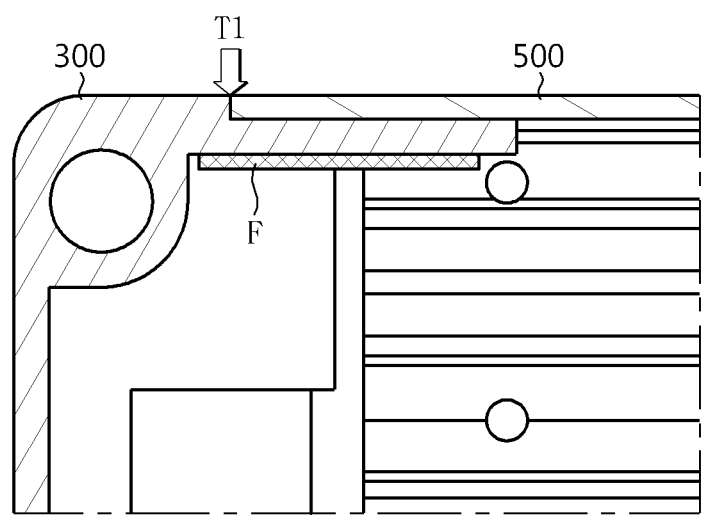
FIG. 13 is a cross-sectional view illustrating a portion of the battery module according to another embodiment of the present disclosure.

FIG. 13 is a cross-sectional view illustrating a portion of the battery module according to another embodiment of the present disclosure. In particular, FIG. 13 may illustrate another embodiment of the configuration shown in FIG. 9.

Referring to FIG. 13, a heat shield F may be provided on an inner side of a left bent portion of the front cover 300. The heat shield F may be placed between the cell assembly 100 and a weld zone of a component such as the front cover 300 and may prevent inward heat transfer. For example, a welding process may be formed on bonding surfaces of the front cover 300 and the left side cover 500 as indicated by T1, and in this case, the heat shield F may block welding heat flowing inward along the bonding surfaces.

According to this configuration of the present disclosure, inner components of the battery module such as pouch-type cases, electrode leads, or bus bars of the secondary cells may not be deformed or damaged. In addition, although the friction stir welding method generate a small amount of heat compared to other welding methods, the above-described configuration may fundamentally prevent even such a small amount of heat from flowing into the battery module.

The heat shielding part F may include a material having a heat transfer coefficient lower than that of components of the case of the battery module such as the front cover 300. For example, the heat shield F may include a heat insulating material containing a heat-resistant resin such as polyimide, a fiber such as glass wool or rock wool, and/or a ceramic material.

In addition, as shown in FIG. 13, the heat shield F may be provided on the inner surface of the front cover 300. In particular, electrode leads may be placed at a side of the front cover 300, and according to the configuration, the heat shield F may reduce or prevent transfer of welding heat to the electrode leads.

The heat shield F may be provided on an inner surface of a component of the case of the battery module such as the front cover 300, the side covers 500 and 600, or the rear cover 400 by a coating method, or may be provided on an inner surface of a component such as the front cover 300 in the form of a separate sheet. Alternatively, the heat shield F may protrude in a convex shape from an inner surface of a component of the case of the battery module such as the front cover 300, the side covers 500 and 600, or the rear cover 400.

In the configuration shown in FIG. 13, the heat shield F is provided on the front cover 300. However, the heat shield F may be provided on inner surfaces of other components of the case of the battery module, that is, on inner surfaces of the left side cover 500, the right side cover 600, the rear cover 400, the cooling plate 200, and/or the upper plate 700.

According to the present disclosure, a battery pack may include the battery module. In addition to the battery module, the battery pack of the present disclosure may further include a pack case for accommodating the battery module and devices for controlling charge and discharge operations of the battery module such as a battery management system (BMS), a current sensor, or a fuse.

The battery module of the present disclosure may be applied automobiles such as electric vehicles or hybrid vehicles. That is, according to the present disclosure, an automobile may include the battery module. Particular, automobiles may be exposed to various vibrations and large impact and are thus required to have high rigidity. In addition, since automobiles are usually placed outdoor, it is necessary to seal automobiles so as to prevent permeation of moisture or foreign substances. When the battery module of the present disclosure is applied to such automobiles, the battery module may be configured to have high strength, rigidity, and sealing performance, and improve productivity.

In the present disclosure, terms indicating directions such as upward, downward, leftward, rightward, forward, and backward are used, but these terms are for ease of description. It will be apparent to those skilled in the art that these terms can vary depending on the position of an object or an observer.

While embodiments of the present disclosure has been described with reference to the accompanying drawings, it should be understood that the embodiments are given by way of illustration only, and various changes and modifications within the scope of the disclosure as defined by the appended claims will become apparent to those skilled in the art.

What is claimed is:

1. A battery module comprising:
    a cell assembly comprising a plurality of secondary cells stacked in at least one direction;
    a cooling plate having a plate shape and placed below the cell assembly to receive the cell assembly thereon;
    a front cover covering a front end portion of the cell assembly and comprising a lower portion welded to the cooling plate;
    a rear cover covering a rear end portion of the cell assembly and comprising a lower portion welded to the cooling plate;
    a left side cover covering a left side of the cell assembly, the left side cover comprising a lower end portion welded to the cooling plate, a front end portion welded to the front cover, and a rear end portion welded to the rear cover;
    a right side cover covering a right side of the cell assembly, the right side cover comprising a lower end portion welded to the cooling plate, a front end portion welded to the front cover, and a rear end portion welded to the rear cover; and
    an upper plate covering an upper portion of the cell assembly, the upper plate comprising a left end portion welded to the left side cover and a right end portion welded to the right side cover, wherein at least one of the front cover and the rear cover comprises a stepped portion such that an end portion of at least one of the left side cover and the right side cover is guided and placed on the stepped portion by an outside-to-inside insertion motion, and wherein the stepped portion is one having an inwardly recessed shape that is exposed on an outer surface of the at least one of the front cover and the rear cover, wherein the cooling plate has a concave-convex structure on an upper surface thereof including concave portions and convex portions having inclined surfaces, wherein the concave portions have inclined surfaces corresponding to a folded shape of sealing portions of the plurality of secondary cells, and wherein the convex portions have inclined surfaces that are not parallel to a ground at top portions thereof and have a slope corresponding to accommodation parts of the plurality of secondary cells.

2. The battery module of claim 1, wherein at least two of the cooling plate, the front cover, the rear cover, the left side cover, the right side cover, and the upper plate are welded together by a friction stir welding method.

3. The battery module of claim 1, wherein the cooling plate comprises an aluminum-containing material, and the front cover, the rear cover, the left side cover, the right side cover, and the upper plate each comprise a steel-containing material.

4. The battery module of claim 3, wherein an insulative coating layer comprising an electrically insulative material or an insulative sheet comprising an electrically insulative material is formed or provided on at least a portion of an inner surface of at least one of the front cover, the rear cover, the left side cover, the right side cover, and the upper plate.

5. The battery module of claim 1, wherein a thermal interface material is provided between the cooling plate and the cell assembly.

6. The battery pack of claim 1, wherein the left side cover and the right side cover are each welded to at least one of the front cover, the rear cover, the cooling plate, and the upper plate by continuously bringing edges thereof into contact with each other and welding the edges together.

7. The battery module of claim 6, wherein zones of the left side cover and the right side cover welded to at least one of the front cover, the rear cover, the cooling plate, and the upper plate each have a straight line shape continuously extending from an end to the other end thereof.

8. The battery module of claim 6, wherein each of zones of the left side cover and the right side cover welded to at least one of the front cover, the rear cover, the cooling plate, and the upper plate is discontinuous from an end to the other end thereof.

9. The battery module of claim 1, wherein front, rear, upper, and lower end weld lines of the left side cover and the right side cover are formed in a ring shape.

10. The battery module of claim 1, wherein at least one of the cooling plate and the upper plate comprises a stepped portion such that an end portion of at least one of the left side cover and the right side is placed on the stepped portion by an outside-to-inside insertion motion.

11. The battery module of claim 1, wherein all joining portions of the left side cover and the right side cover to be jointed to the front cover, the rear cover, the cooling plate, and the upper plate are exposed at lateral sides of the battery module.

12. The battery module of claim 1, wherein a heat shield is provided between the cell assembly and a weld zone of at least one of the cooling plate, the front cover, the rear cover, the left side cover, the right side cover, and the upper plate so as to prevent heat transfer in an outside-to-inside direction.

13. A battery pack comprising the battery module of claim 1.

14. An automobile comprising the battery module of claim 1.

15. The battery module of claim 1, wherein the stepped portion of the at least one of the front cover and the rear cover has a greater thickness than that of the at least one of the left side cover and the right side cover.

* * * * *